United States Patent [19]
Rhodes et al.

[11] Patent Number: 5,432,900
[45] Date of Patent: Jul. 11, 1995

[54] INTEGRATED GRAPHICS AND VIDEO COMPUTER DISPLAY SYSTEM

[75] Inventors: Kenneth E. Rhodes, Portland; Robert T. Adams, Lake Oswego; Sherman Janes, Portland; Rohan G. F. Coelho, Hillsboro, all of Oreg.

[73] Assignee: Intel Corporation, Santa Clara, Calif.

[21] Appl. No.: 261,284

[22] Filed: Jun. 16, 1994

[51] Int. Cl.⁶ .............................................. G06T 1/00
[52] U.S. Cl. .................................... 395/154; 345/118
[58] Field of Search ....................... 348/589; 345/118; 395/153, 154, 162, 163

[56] References Cited

U.S. PATENT DOCUMENTS

| | | | |
|---|---|---|---|
| 4,498,081 | 2/1985 | Fukushima et al. | 358/240 |
| 4,530,009 | 7/1985 | Mizokawa | 358/183 |
| 4,539,585 | 9/1985 | Spaekova et al. | 358/93 |
| 4,644,401 | 2/1987 | Gaskins | 358/183 |
| 4,984,183 | 1/1991 | Ohuchi | 364/521 |
| 5,012,342 | 4/1991 | Olsen et al. | 358/181 |
| 5,027,212 | 6/1991 | Marlton et al. | 358/183 |
| 5,119,080 | 6/1992 | Kajimoto et al. | 340/723 |
| 5,161,102 | 11/1992 | Griffin et al. | 364/488 |
| 5,195,177 | 3/1993 | Kamiyama et al. | 395/162 |
| 5,220,312 | 6/1993 | Lumelsky et al. | 340/721 |
| 5,251,301 | 10/1993 | Cook | 395/163 |
| 5,264,837 | 11/1993 | Buehler | 395/153 |
| 5,271,097 | 12/1993 | Barker et al. | 395/162 |
| 5,274,364 | 12/1993 | Li et al. | 345/118 |
| 5,274,753 | 12/1993 | Roskowski et al. | 395/135 |

FOREIGN PATENT DOCUMENTS

0454414 10/1991 European Pat. Off. .

OTHER PUBLICATIONS

Worthington, "True Vision Enhances Its PC Video Graphics Card", Info world, vol. 12 No. 32 (Aug. 6, 1990), pp. 23 Abstract Only.

Quinnell, "Video Chip Set Handles Decompression Special Effects, and Mixing in Many Formats", EDN, vol. 35 No. 25 (Dec. 6, 1990), pp. 72-73, Abstract Only.

*Primary Examiner*—Heather R. Herndon
*Assistant Examiner*—N. Kenneth Burraston
*Attorney, Agent, or Firm*—Blakely, Sokoloff, Taylor Zafman

[57] ABSTRACT

Graphical, video, and audio data is integrated into a single processing environment. The present invention employs an integrated graphics/video controller (IVC) which interfaces with application software through a graphics API and a video API. The IVC receives graphics commands through the graphics API and video commands through the video API. A mask driver produces information from the graphics commands including clipping information, graphics information and mask information. A blender uses the mask information, the graphics information, and the clipping information for combining or compositing graphics images with video images. The video commands of the video command stream provide functions for configuring the operation of the IVC. These functions include commands for loading software video decoders in a decoder block within the IVC. Video data transferred to the IVC via the video API may be encoded in a variety of different formats. The present invention provides a means for dynamically loading a plurality of different video decoders through a video command interface to a video decode block both within the IVC. Each of the independent decoders within the decode block contain processing logic for decoding a particular type of video data to produce a uniform type of decoded video data which is provided to the blender. The blender receives the decoded video data and combines the video data with graphics data as defined by the mask information, the clipping information, and the graphics information.

26 Claims, 14 Drawing Sheets

FIGURE 6
Decoder Table

| Address | Length | ID Code | Capability Code |
|---------|--------|---------|-----------------|
|         |        |         |                 |
|         |        |         |                 |
|         |        | ○<br>○<br>○ |             |
|         |        |         |                 |
|         |        |         |                 | entry n

Minimum Capability Table

INTEGRATED GRAPHICS AND VIDEO COMPUTER DISPLAY SYSTEM

This is a continuation of application Ser. No. 07/901,280, filed Jun. 19, 1992, now abandoned.

BACKGROUND OF THE INVENTION

1. Field Of The Invention

The present invention relates to the field of computer display systems. Specifically, the present invention pertains to the manipulation and control of graphics and video data for display on a display medium. The present invention further relates to the control and manipulation of audio data that is output in synchronization with images on a display screen.

2. Prior Art

Many conventional computer graphics display systems exist in the prior art. These systems provide mechanisms for manipulating and displaying graphics objects on a display screen. These graphic objects include points, vectors, conical shapes, rectangles, polygons, arcs, alpha numeric information, shaded or color-filled regions, and other forms of graphic imagery, typically represented as objects in a two dimensional or three dimensional virtual space. A graphics computer program in these conventional systems provides mechanisms by which a computer user may manipulate graphic objects using functions provided by the graphics software. This graphics software typically includes a graphics driver software module that operates in conjunction with a graphics controller to load a frame buffer with digital information that is subsequently converted to a form displayable on a display screen. It will be apparent to those skilled in the art that the use of graphics driver software, graphics controllers, and frame buffers is well known to those of ordinary skill in the art.

Other prior art computer display systems provide a means for displaying video images on a display screen. These video images comprise streams of digital video data encoded in several well known formats such as MPEG, JPEG, and RTV format. Unlike graphical data, this video data includes no representations of individual objects within the video image. To the computer display system, the video image is a homogeneous video data stream encoded in a particular way. In prior art systems, this video data is received by processing logic that includes a particular mechanism for decoding the video data and transferring the decoded video data into a frame buffer for display on the display screen. Because of the different nature of graphical data as compared with video data, prior art systems tend to handle graphical and video data in separate subsystems within the computer display system. Thus, graphical data and video data typically take parallel and independent paths through prior art systems as the data is processed for display. In some cases, two separate frame buffers are used, one for graphical data and one for video data. In other systems, a single frame buffer is used; however, graphical data occupies one distinct region of the frame buffer and video data occupies a different portion of the frame buffer.

A number of problems exist in prior art systems that process graphical and video data independently. First, these prior art systems cannot efficiently combine graphical and video images together into a composite form that is easily manipulated. For example, scrolling a graphical image across a video background typically requires additional processing to prevent image from being destroyed. Secondly, synchronizing graphics and video images in prior art systems is typically very difficult. Synchronization problems in prior art systems result in video images that appear torn or disjoint. Moreover, aligning graphics images at the proper location and time in a video image is difficult using prior art techniques. Thirdly, the video data decoding schemes used in prior art systems are typically limited to a single decoding scheme. For example, less expensive graphics programs may provide software implemented video data decoders. Although these systems provide an inexpensive solution, they tend to run slowly and often provide decoded video data of a low resolution. Other more expensive prior art systems provide graphics hardware that may be used to decode a video data stream. These systems are fast and provide high resolution decoded video data; however, they are also substantially more expensive. Moreover, users wanting to upgrade from a less expensive system, such as a software implemented decoder, to a more expensive system, such as a graphic hardware implemented system, must first reconfigure or reinstall their graphics application program in order to take advantage of a different video decoding technique. This additional impact at the applications program level further increases the upgrade cost to the computer user.

Thus, a better means for integrating graphical and video information in a single computer display system is needed.

SUMMARY OF THE INVENTION

The present invention integrates graphical, video, and audio data into a single processing environment. Therefore, the present invention includes a processor (CPU), a graphics controller, a capture controller, and an audio controller. The graphics controller is a specialized graphics control processor coupled to a peripheral bus. The graphics controller, operating under the software control of the CPU performs processing and compositing of the graphics and video data to be displayed on a CRT display. This software control methodology is the subject of the present invention and is described in detail herein.

Application software interfaces with system software of the present invention through a graphics application program interface (API), a video API, and an audio API. These APIs provide a high level functional interface for the manipulation of graphics, video, and audio information. Unlike the prior art, however, the present invention employs an integrated graphics/video controller (IVC). The IVC interfaces with application software through the graphics API and the video API. The output data generated by the IVC is a composite graphics and video image which is stored for output to a display device in a frame buffer. The IVC of the present invention also interfaces with an audio driver. The IVC provides the audio driver with synchronization information used to synchronize a video image stream with an audio data stream. The IVC receives timing information from a display timing control circuit. The timing information provided by the display timing control circuit is used by the IVC for synchronizing the loading of the frame buffer. The display timing control circuit provides a means for optimizing the operation of the IVC for the timing characteristics of a particular display system that is used with the present invention.

The IVC receives graphics instructions through the graphics API and video instructions though the video API. The graphics API interface provides a means by which an application program may interface with a display driver for displaying graphics images on a display screen. A graphics command interface and a mask driver derive information from the graphics commands provided by an application program prior to transferring the graphics information to a display driver. Three types of information derived from the graphics command stream are produced by the mask driver. First, clipping information is derived by the mask driver. Clipping information is used to enable the display of graphics information within a specified window on the display screen. A window is a rectangular portion of the display screen having particular attributes that are well known in the art. Clipping information is used to enable the display of graphics information within the window and to suppress the display of information outside the boundary of a window. The second type of information derived by the mask driver from the graphics command stream is the actual graphic content of a specified window. The third type of information derived by the mask driver is mask information. A blender uses the mask information, the graphics information, and the clipping information for combining or compositing graphics information with video information.

The IVC also receives video image information through the video API. The video API provides a means by which an applications program may interface with the IVC for the purpose of manipulating video images for display on a display screen. A video command stream is received by a video command interface through the video API. The video command stream comprises video commands for configuring the operation of the IVC and video data which comprises a combination of video and audio data with synchronization information for synchronizing the display of frames of video images.

The video commands of the video command stream provide functions for configuring the operation of the IVC. These functions include commands for loading software video decoders in a decoder block within the IVC. Video data transferred to the IVC via the video API may be encoded in a variety of different formats. The present invention provides a means for dynamically loading a plurality of different video decoders through a video command interface to a video decode block both within the IVC. Each of the independent decoders within the decode block contain processing logic for decoding a particular type of video data to produce a uniform type of decoded video data which is provided to the blender. The blender receives the decoded video data and combines the video data with graphics data as defined by the mask information, the graphics information, and the clipping information. The combined or composited image is then transferred to a display driver and output to a display through a frame buffer.

BRIEF DESCRIPTION OF THE DRAWINGS

FIGS. 5-11 are flowcharts illustrating the processing logic of the video command interface.

DETAILED DESCRIPTION OF THE PREFERRED EMBODIMENT

The present invention is an integrated graphics and video display system for manipulating and viewing both graphical and video data in a single integrated system. In the following description, numerous specific details are set forth in order to provide a thorough understanding of the invention. However, it will be apparent to one of ordinary skill in the art that these specific details need not be used to practice the present invention. In other instances, well known structures, circuits, and interfaces have not been shown in detail in order not to obscure unnecessarily the present invention.

Figure 1:
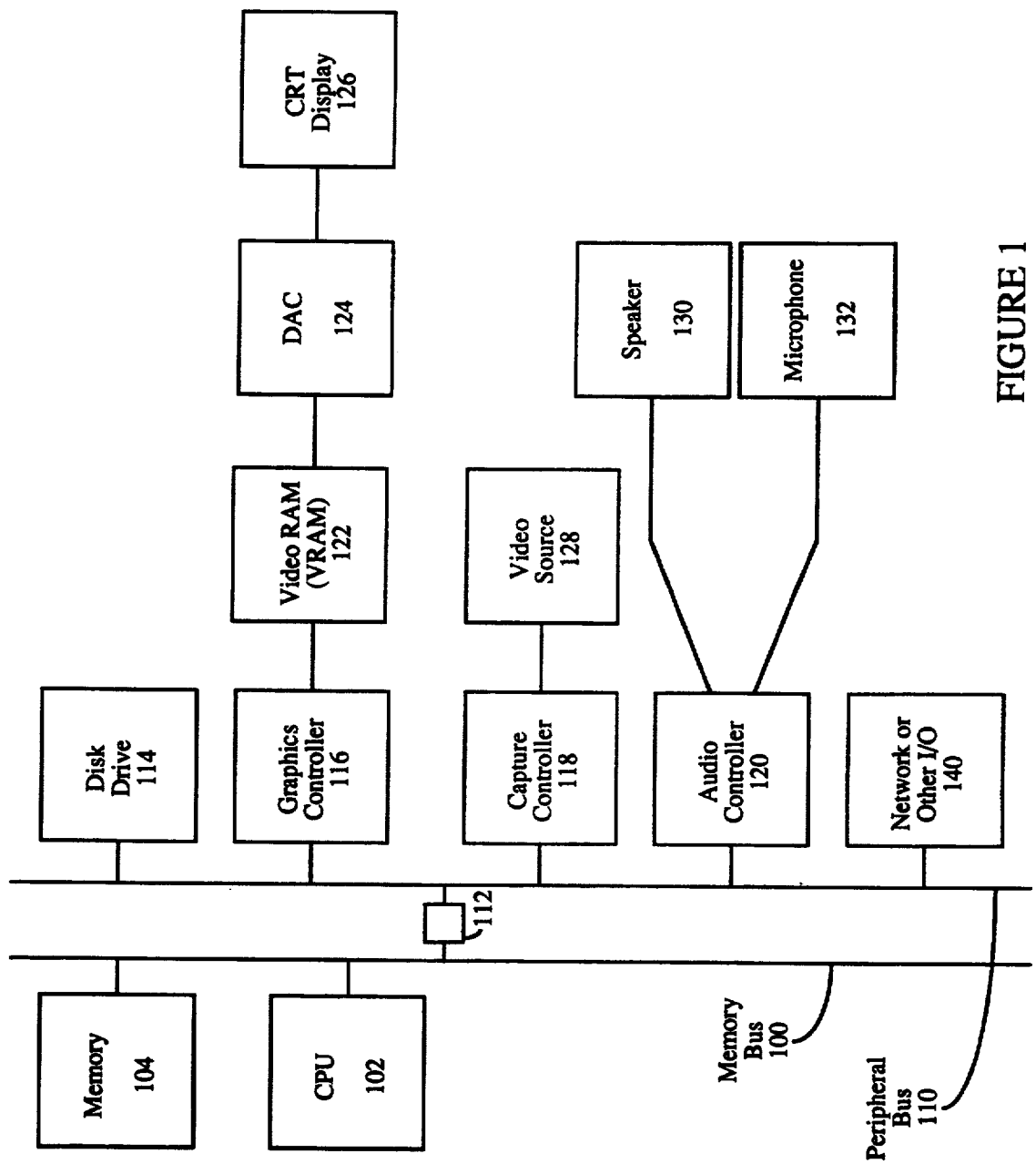
FIG. 1 is a block diagram of the computer system hardware used in the preferred embodiment.

Referring now to FIG. 1, a block diagram of the computer system hardware used in the present embodiment is illustrated. The computer system used in the preferred embodiment comprises a memory bus 100 for communicating information, a processor (CPU) 102 coupled with memory bus 100 for processing information, and a memory 104 coupled with bus 100 for storing information and instructions for CPU 102 and other components of the computer system. In the preferred embodiment, memory bus 100 is a high speed bus which is well known to those of ordinary skill in the art. In the preferred embodiment, CPU 102 is an i486® brand microprocessor manufactured by the assignee of the present invention. i486® is a registered trademark of Intel Corporation, Santa Clara, Calif. Memory 104 in the preferred embodiment comprises dynamic random access memory (DRAM) and read only memory (ROM). Coupling a CPU 102 and a memory 104 together on a memory bus 100 as shown in FIG. 1 is well known in the art.

FIG. 1 also illustrates a peripheral bus 110 coupled to memory bus 100 via a bridge 112. The use of a bridge between two computer buses is well known in the art. Similarly, the use of a peripheral bus such as peripheral component interface (PCI) is described in co-pending patent application Ser. No. 07/886,992.

A disc drive 114 and a network interface or other input/output device 140 may also optionally be coupled to peripheral bus 110. Again, disc drive and network interface apparatus and their connection to a peripheral bus 110 is well known in the art.

The present invention integrates graphical, video, and audio data into a single processing environment. Therefore, the present invention centers around the interaction between CPU 102 and graphics controller 116, capture controller 118, and audio controller 120. Graphics controller 116 is a specialized graphics control processor coupled to peripheral bus 110. Graphics controller 116 operating under the software control of CPU 102 performs processing and compositing of the graphics and video data to be displayed on CRT display 126. This software control methodology is the subject of the present invention and is described in detail below. The hardware platform in which the present invention operates is described in patent application Ser. No. 07/901,519, now U.S. Pat. No. 5,243,447, filed concurrently with the present patent application. In general, this hardware platform comprises graphics controller 116 to which a video random access memory (VRAM) 122 is coupled. Video RAM 122 provides storage for a frame buffer which represents a binary encoded representation of the picture elements (pixels) that are displayed on CRT display 126. Video RAM 122 is used for storage of both graphical information and video information. Using the processing techniques described herein and the hardware platform described in the above-referenced co-pending patent application, both graphical and video data may be composited (i.e. combined) into a single frame buffer within video RAM 122. This composite graphical and video image is converted to analog form by digital to analog converter (DAC) 124 and output to CRT display 126. In this manner, applications programs executing within CPU 102 can use the processing logic of the present invention to display composited graphical/video images in arbitrary locations on CRT display 126.

Capture controller 118 is coupled to peripheral bus 110. Capture controller 118 is a hardware system for receiving and processing video display data from video source 128. Capture controller 118 receives video images from video source 128 and generates video image data packets for transmission on peripheral bus 110. The video image data packets comprise still video images or a series of motion video images which include synchronization information. The video data may be moved on peripheral bus 110 into graphics controller 116 for compositing with graphics data or moved to CPU 102 or memory 104 via bridge 112 and memory bus 100. Video source 128 is a video camera, a video recording device, or other source for video image data. The structure and detailed operation of capture controller 118 is beyond the scope of the present invention.

Audio controller 120 is also coupled to peripheral bus 110. Audio controller 120 provides a means for receiving and processing audio data from a microphone 132 or other audio input device. Audio controller 120 generates a series of audio data packets for transfer on peripheral bus 110. The audio data packets represent a series of sounds retrieved from microphone 132 or other audio input device. Audio controller 120 also provides synchronization information with each audio data packet. Audio controller 120 also provides a means for decoding audio data received via peripheral bus 110 and outputting audio signals to speaker 130 or other audio output device. The structure and detailed operation of audio controller 120 is beyond the scope of the present invention.

Figure 2:
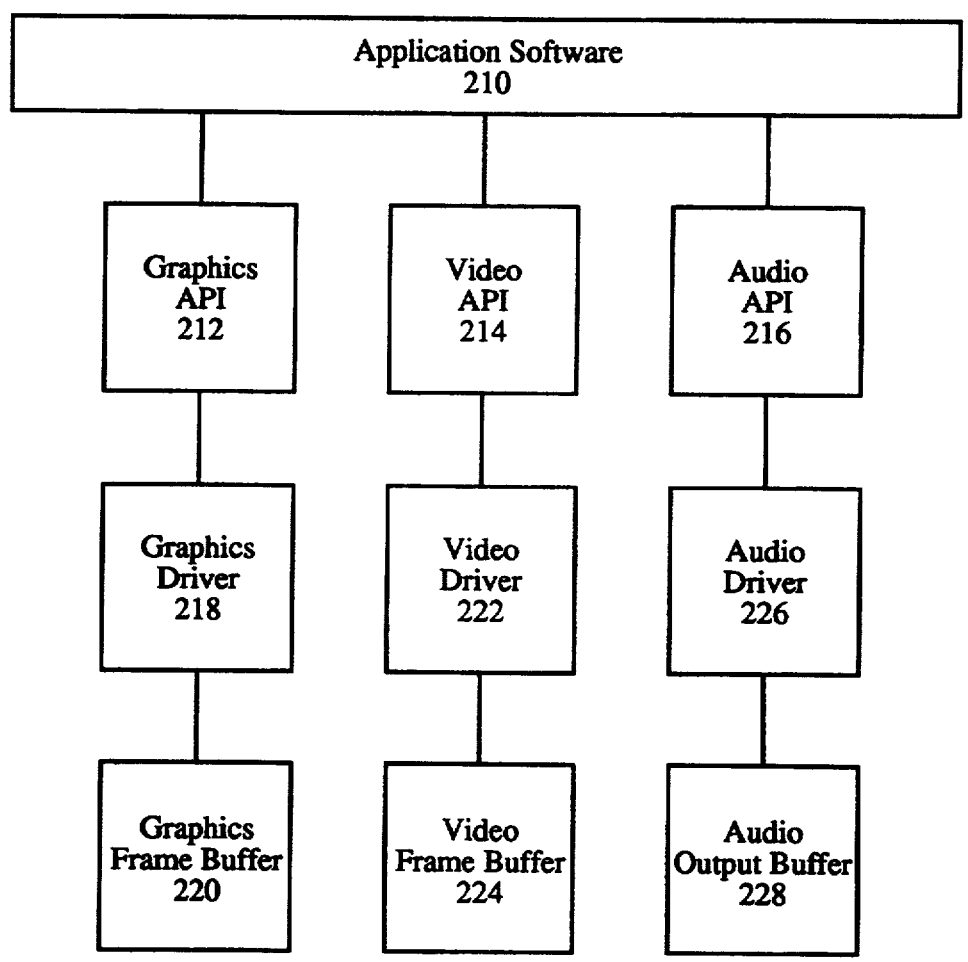
FIG. 2 is a block diagram of the prior art software used in a system for processing graphics, video, and audio data.

Referring now to FIG. 2, a block diagram illustrates the prior art method for processing graphics, video, and audio data. Application software 210, residing in memory 104 and executed by CPU 102, comprises user level programming tools for manipulating and processing graphics, video, and audio data. Several application programs of this type exist in the prior art. An example of one such application program is AutoDesk Animator ™ for Microsoft Windows ™ developed by AutoDesk ™, Inc. Application software 210 interfaces with system software through several application program interfaces (API). APIs provide a means by which an application program may request service from system software through the functions provided in an API. In the prior art, three APIs are generally provided: 1) graphics API, 2) a video API, and 3) an audio API. As illustrated in FIG. 2, graphics API 212 provides an interface between application software 210 and graphics driver 218. Graphics API 212 provides a list of public functions and corresponding calling parameters with which application software 210 may create and manipulate graphics objects that are stored for display in graphics frame buffer 220. Graphics objects typically include points, vectors, conical shapes, polygons, rectangles, blocks of text, arcs, and other shapes that may be represented in a two or three dimensional virtual space.

In a similar manner, video API 214 provides an interface between application software 210 and video driver 222. Video API 214 provides a set of functions for manipulating video image data that is processed by video driver 222 and eventually stored for output to a display screen in video frame buffer 224. Because prior art systems typically used graphic display hardware which was independent of video display hardware, the processing of graphic and video data in prior art systems was typically done using independent and distinct hardware and software processes. This prior art design is therefore considered a loosely coupled or low integration system; because, the graphic and video data is not integrated as it travels from the application software 210 to a display screen (not shown). Rather, in the prior art systems, graphic and video data travels two parallel paths through the processing architecture.

Audio API 216 provides an interface between application software 210 and audio driver 226. Audio API 216 provides a set of interfaces for manipulating audio information that is processed by audio driver 226 and stored in audio output buffer 228 for eventual output to an audio emission system (not shown). The audio API 216 provides a set of audio related functions with which application software 210 may manipulate audio information. Again, the loosely coupled or low integration approach used in the prior art is apparent as audio information travels an independent path from application software 210 to audio output buffer 228. The independent path traveled by audio data in the prior art systems is less of a performance penalty; however, because audio information is destined for a different output device than graphics and video data. Both graphics and video data, on the other hand, are typically displayed on the same display device.

Several problems exist with the low integration approach used in the prior art. Because graphics and video information is processed using separate processes, prior art systems do not provide an efficient means for combining graphics and video images together in a composite form. Secondly, because certain items of hardware in the prior art design are dedicated to processing either graphics or video data, some items of the prior art design must be duplicated for processing both graphics and video data. Some of these duplicated hardware elements include frame buffer memory 220 and 224. Because of the independent paths traveled by graphics and video data in the prior art system, other hardware logic is required to handle the parallel paths. This additional logic includes multiplexing logic which determines which frame buffers data is to be displayed for each pixel location. Moreover, additional synchronization logic is required to synchronize the output of graphics and video data as the information is merged just before output to the display device. Thus, the prior art design suffers from low graphics/video integration functionality and increased hardware cost due to the low integration design.

Figure 3:
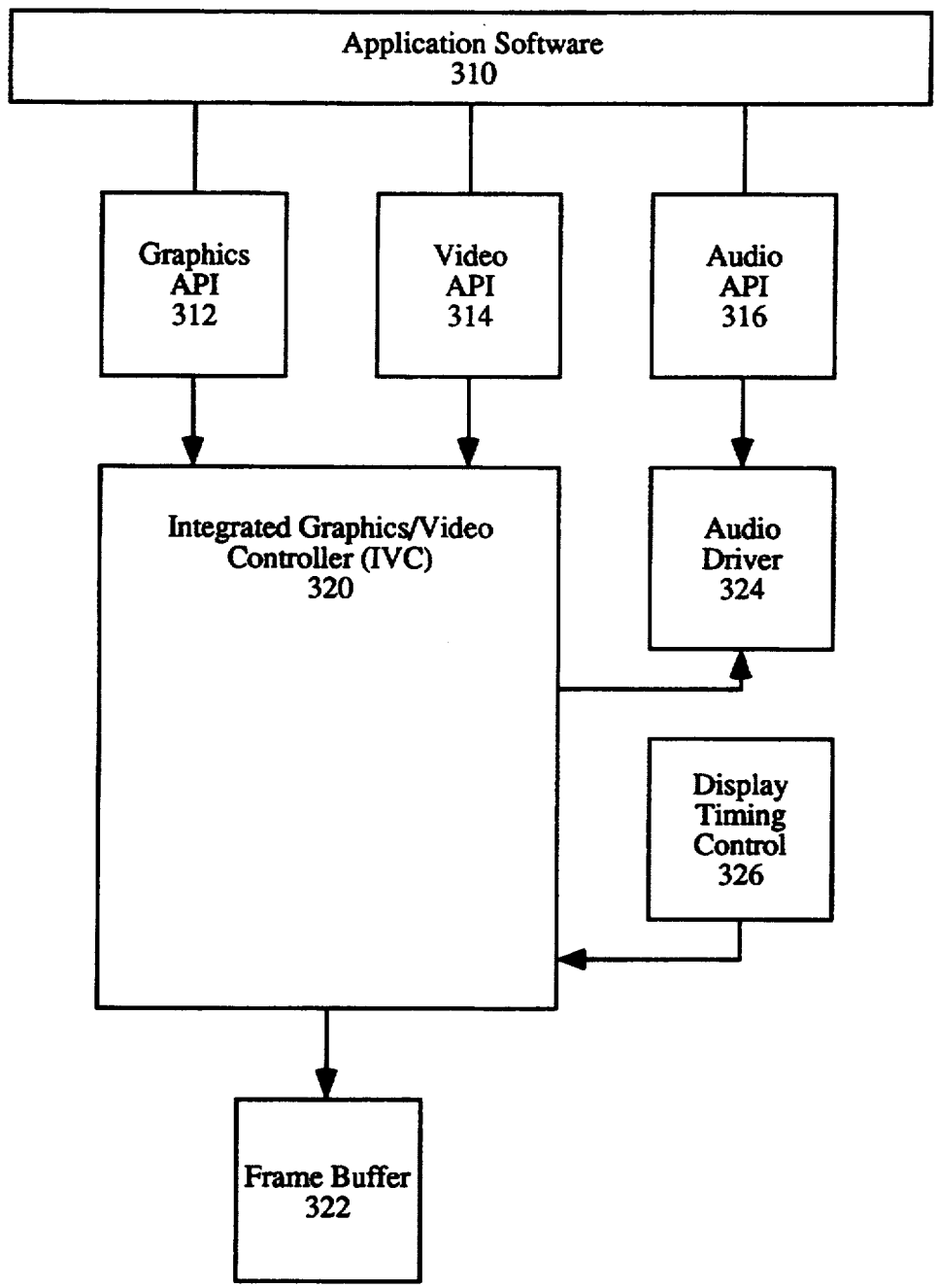
FIG. 3 is a block diagram of the software used in the preferred embodiment of the present invention.

Referring now to FIG. 3, the structure of the system software used in the present invention is illustrated.

Again, application software 310 interfaces with system software through graphics API 312, video API 314, and audio API 316. In a manner similar to the application program interfaces illustrated in FIG. 2, APIs 312, 314, and 316 provide a high level functional interface for the manipulation of graphics, video, and audio information. Unlike the prior art, however, the present invention employs an integrated graphics/video controller (IVC) 320. IVC 320 interfaces application software 310 through graphics API 312 and video API 314. The structure and operation of IVC 320 is illustrated in detail in connection with FIG. 4. The output data generated by IVC 320 is a composite graphics and video image which is stored for output to a display device in frame buffer 322. IVC 320 also interfaces with audio driver 324. IVC 320 provides audio driver 324 with synchronization information used to synchronize a video image stream with an audio data stream. IVC 20 receives timing information from a display timing control circuit 326. The timing information provided by display timing control 326 is used by IVC 320 for synchronizing the combination of graphics and video data and for controlling when the combined data is loaded into the frame buffer 322. Display timing control circuit 326 provides a means for optimizing the operation of IVC 320 for the timing characteristics of a particular display system that is used with the present invention.

Figure 4:
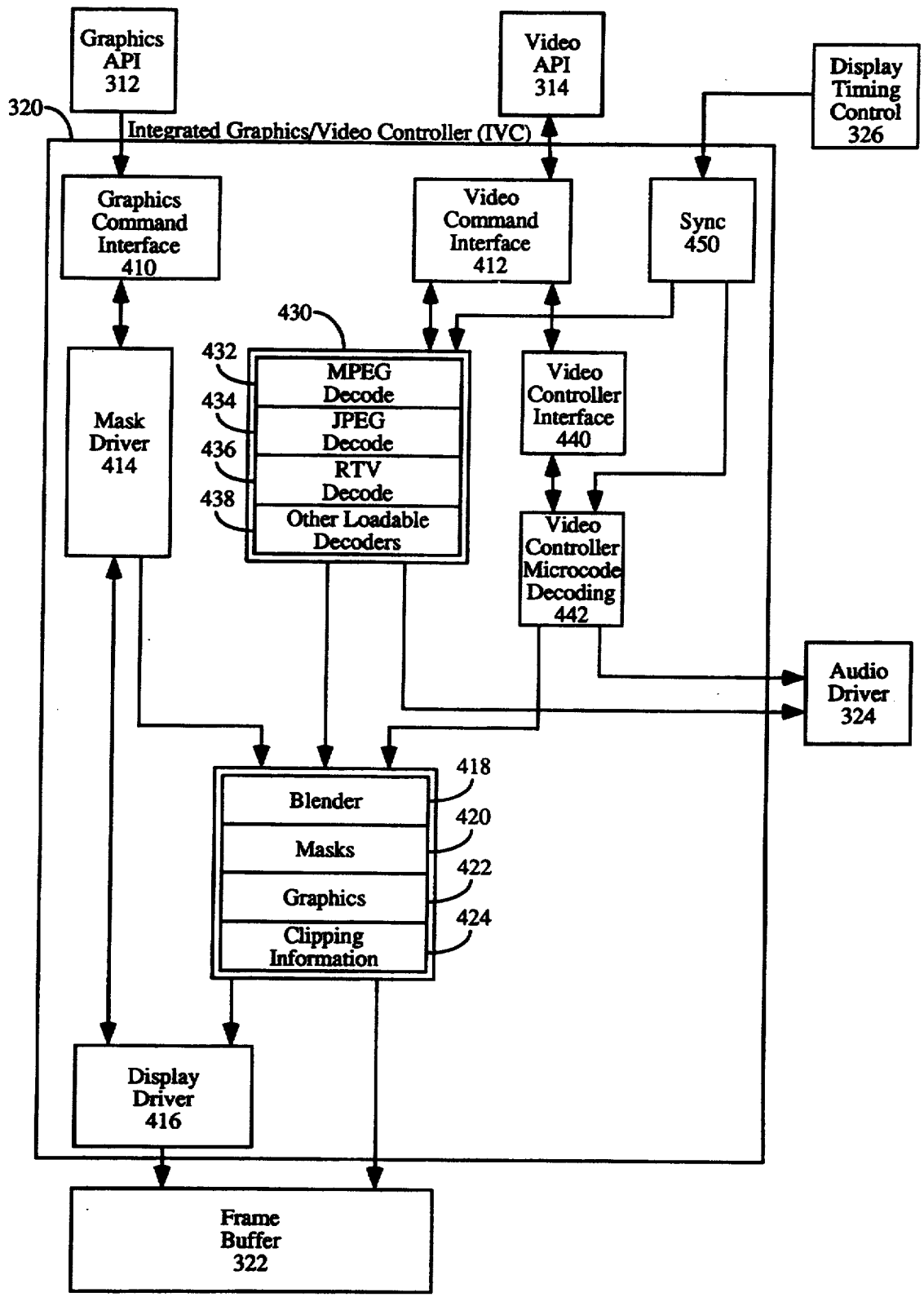
FIG. 4 is a block diagram of the integrated graphics/video controller (IVC).

Referring now to FIG. 4, a detailed block diagram of the structure of integrated graphics/video controller (IVC) 320 is illustrated. IVC 320 receives graphics instructions through graphics API 312 and video instructions though video API 314. In the preferred embodiment, graphics API 312 is a GDI interface developed by Microsoft Corporation of Redmond, Wash. The graphics API interface 312 provides a means by which an application program may interface a display driver for displaying graphics images on a display screen. In the present invention, the IVC 320 receives graphics commands via graphics API 312 through a graphics command interface 410. Graphics command interface 410 and mask driver 414 derive information from the graphics commands provided by an application program prior to transferring the graphics information to display driver 416. Three types of information derived from the graphics command stream are derived by mask driver 414. First, clipping information is derived by mask driver 414. Clipping information is used to enable the display of graphics information within a specified window on the display screen. A window is a rectangular portion of the display screen having particular attributes that are well known in the art. Clipping information is used to enable the display of graphics information within the window and to suppress the display information outside the boundary of a window. The clipping information derived by mask driver 414 is stored in area 424 as illustrated in FIG. 4. The second type of information derived by mask driver 414 from the graphics command stream is the actual graphic content of a specified window. The graphic contents of a window is specified in terms of a pixel bitmap. Each pixel within the window is represented by one or more binary bits of memory in the bitmap. This graphics information as derived by mask driver 414 is stored in graphics area 422. The graphics information is also transferred from mask driver 414 to display driver 416 for subsequent transfer to frame buffer 322. The third type of information derived by mask driver 414 is mask information. Because a particular window may contain both graphics and video data, masks are used to specify whether or not video information may over write graphics information within a particular window. The mask information as derived by mask driver 414 is stored in area 420. Blender 418 uses mask information 420, graphics information 422, and clipping information 424 for combining or compositing graphics information with video information as will be described below.

IVC 320 receives video image information through video API 314. In the preferred embodiment, video API is a Digital Video Media Controlled Interface (DVMCI) jointly developed by Microsoft Corporation of Redmond, Wash., IBM Corporation, and Intel Corporation. The video API 314 provides means by which an applications program may interface with IVC 320 for the purpose of manipulating video images for display on a display screen. A video command stream is received by video command interface 412 through video API 314. The video command stream comprises video commands for configuring the operation of IVC 320 and video data which comprises a combination of video and audio data with synchronization information for synchronizing the display of flames of video images.

The video commands of the video command stream provide functions for configuring the operation of IVC 320. These functions include commands for loading software video decoders in decoder block 430. Video data transferred to video command interface 412 via video API 314 may be encoded in a variety of different formats. These video encoding formats include MPEG format (MPEG is an acronym for Motion Picture Experts Group TM ), JPEG format (JPEG is an acronym for Joint Photographic Experts Group TM ), and RTV format (RTV is an acronym for Real Time Video TM ). MPEG, JPEG, and RTV video encoding is well known in the art. It will be apparent to those skilled in the art that other methods for encoding video data are available. It will also be apparent to those skilled in the art that methods exist for decoding MPEG, JPEG, and RTV video formats. The present invention provides a means for dynamically loading a plurality of different video decoders through video command interface 412 to video decode block 430. Each of the independent decoders within decode block 430 such as MPEG decode 432, JPEG decode block 434, RTV decode block 436, and other custom loadable decoders 438 contain processing logic for decoding the particular type of video data to produce a uniform type of decoded video data which is provided to blender 418. Blender 418 receives the decoded video data and combines the video data with graphics data as defined by mask information 420, graphics information 422, and clipping information 424. The combined or composited image is then transferred to display driver 416 and output to the display through frame buffer 322. In an alternative embodiment, the blender can also transfer display data directly into the frame buffer 322 without processing by the display driver.

Video decode block 430 also separates the video information from the audio information as received together through video API 314. The audio information is output by video decode block 430 to audio driver 324. In addition, video decode block 430 provides synchronization information to audio driver 324 which is used for synchronizing the audio data stream with the video image stream.

In addition to maintaining a plurality of independent video data decoders, video decode block 430 also maintains information indicating which video decoders have been loaded and thus which video decoders are available for use by an application program. This information concerning the loaded video decoders maintained within video decode block 430 is referred to as the capability provided by video decode block 430. This information defines the video decode capability provided by video decode block 430. This video decode capability may be queried by an application program through video API 314. A command provided within video API 314 may be used by an application program to trigger the transfer of this capability information from IVC 320 through video command interface 412 and video API 314 back to an application program. Thus, the present invention provides a capabililty reporting mechanism.

The video data received by video command interface 412 is comprised of a series of video image frames as well known in the art. Audio data corresponding to the video frames is also provided across the video API interface 324. Software decoders within video decode block 430 must synchronize the display of video frames as requested by an application program using video API 314. Sync block 450 provides an input to video decode block 430 which is used during this video frame synchronization process. Sync block 450 receives an input from display timing control circuit 326. As described earlier, display timing control 326 is a hardware timing source. Sync block 450 converts this timing source to a frame rate that corresponds to a rate at which individual video frames are displayed. This frame rate information is transferred to sync block 450 to video decode block 430. The frame rate information is used by video decode block 430 to display the application program requested video frame at the appropriate instant in time. This frame rate information is also provided to a video controller microcode decoding block 442. Microcode decoding block 442 is described below.

In the same manner that video data is provided to video decode block by video command interface 412, video data is provided to a video controller interface 440 by video command interface 412. Video controller interface 440 is a software interface to graphics controller hardware 116 as displayed in FIG. 1. The video controller interface 440 communicates with video controller microcode 442 located within graphics controller 116. Video controller microcode provides high speed video data decoding using specialized graphics hardware provided within graphics controller 116. In this manner, video controller microcode decoding 442 provides a higher performance hardware implemented video data decoding scheme similar to the typically lower performance and slower software video decoding provided by video decode block 430. As video data is received by video command interface 412 through video API 314, video command interface 412 may transfer the video data to video decode block 430 or video controller microcode 442 through video controller interface 440. In this manner, video command interface 412 may selectively determine the level of performance desired in the decoding of video data received through video API 314. In the best of situations, video command interface 412 which is the highest performance option for video decoding that may be available. Because the hardware decoding provided by video controller microcode 442 is typically the optimal video decode solution, video command interface 412 would transfer video data though video controller interface 440 and bypass the transfer of data to video decode block 430. However, in many practical situations, specialized graphics controller hardware may not ba available in a particular computer system. This is often the case because graphics controller hardware is typically an expensive addition to a personal computer system. In order to provide a less expensive option, the software based video decode block 430 is provided thereby removing graphics controller hardware as a necessary computer system component. If the video command interface 412 determines that graphics controller hardware is not present in a particular system or the application program selectively chooses to use software based video decoding, video command interface 412 routes video data through video decode block 430 instead of through video controller interface 440. In this manner, two basic video decoding options, (i.e. one software and one hardware option) are provided within IVC 320. In general, the applications program sending video data through video API 314 is not aware and does not need to be aware of the manner in which the video data is actually decoded by IVC 320. Thus, the present invention provides a means for scaling or selecting the level of video decoding performance provided in a particular system as balanced against the overall cost of the system.

If graphics controller hardware is provided in a particular computer system, video command interface 412 maintains information indicating the presence of the graphics controller hardware. This information is updated typically when the computer system is first initialized. Using a function provided by video API 314, an application program may query IVC 320 for the presence of graphics controller hardware. Information representing the presence of graphics controller hardware and the type or performance provided by a particular graphics controller is part of the capability information maintained within IVC 320. This information may be queried by an application program in a manner similar to the way capability information pertaining to video decode block 430 may be queried. A function within video API 314 is provided for querying this capabililty information maintained within video command interface 412. Thus, using this capability reporting mechanism, an application program may determine the software or hardware video data decoding resources available. When the capability reporting function is activated by an application program, a packet of capability information is transferred from video command interface 412 through AVI 314 and back to a requesting application program.

If graphics controller hardware is available, hardware video data decoding may be used. In this case, video command interface 412 routes a video stream through video controller interface 440 to video controller microcode 442. Using a high speed hardware based video decoding process, video controller microcode 442 decodes the input video stream and produces a decoded video image similar to the decode video data provided by video decode block 430. This decoded video information is provided to blender 418. As described above, blender 418 uses mask information 420, graphics information 422, and clipping information 424 to combine the decoded video data with graphics data to produce a composite display image which is output to display driver 416 and frame buffer 322.

As part of the hardware based decoding process, video controller microcode 442 separates the input video data stream from the audio data stream. The audio data stream is output along with synchronization information to audio driver 324. The audio and synchronization information provided to audio driver 324 by video controller microcode 442 is similar to the audio data and synchronization information provided to audio driver 324 by video decode block 430. In both cases, synchronization information is provided for synchronizing the audio stream with the corresponding video frames.

Also as part of the hardware based video decoding performed by video controller microcode 442, the decoding of video frames is accomplished in reference to a time base provided by sync block 450. As described earlier, sync block 450 translates a hardware specific timing reference provided by display timing control 326 to a frame rate for synchronizing the display of individual video frames. This frame rate is provided by sync block 450 to video controller microcode 442 and used as a time base for the decode of video data.

The processing logic and operations performed by video command interface 412 is described below in connection with FIGS. 5-11. Video command interface 412 is responsible for maintaining capability information pertaining to the video decoders resident within IVC 320. This information pertaining to the video decoders is stored in a table within video command interface 412 in a format illustrated in FIG. 6. Referring to FIG. 6, a decoder table containing information relative to the video decoders resident within IVC 320 is illustrated. The decoder table comprises information relative to a plurality of decoders. Information for each decoder corresponds to an entry within the decoder table. Information maintained for each decoder comprises an address of an entry point to the processing logic for the decoder. A length field is maintained for each decoder that defines the size of the memory area used for storage of the processing logic and data associated with the decoder. Each decoder also has associated with it an identification (ID) code that identifies the type of video data upon which the decoder may operate. The ID code is used to determine the types of video data compatible with the decoder. Finally, a capability code is also associated with each decoder. The capability code specifies a level of functionality, speed, and resolution associated with the decoder. For example, a particular video decoder (such as MPEG) may be software implemented or hardware implemented. Even though operating on the same type of MPEG input video data, the type types of decoders may produce decoded video data of a slightly different quality in a different execution time period. Typically, the hardware decoders operate faster and can produce better results. However, software decoders may also provide a lower cost but acceptable solution for some applications. The capability code provides a means for encoding a ranking between decoders that operate on the same type of data. This ranking can be used to arrange the decoders from a high value, corresponding to decoders producing the best results in the shortest time period, to a lowest capability code, corresponding to decoders producing the lowest quality decoded video in the longest period of time. The address information in the decoder table may be used to differentiate between software resident decoders and hardware resident decoders. Typically, the hardware resident decoders are implemented in microcode within the graphic controller microcode decoding block 442. In an alternative embodiment, an additional field may be added to the decoder table that specifies whether a particular decoder is hardware or software resident if the address field cannot be used for this purpose.

The processing logic within video command interface 412 performs four basic operations in the preferred embodiment as requested by an application program through video API 314. These four operations are: 1) initialize IVC, 2) load decoder, 3) decode video data, and 4) perform capability reporting. The processing performed during each of these operations by video command interface 412 is described in the following sections.

Figure 5:
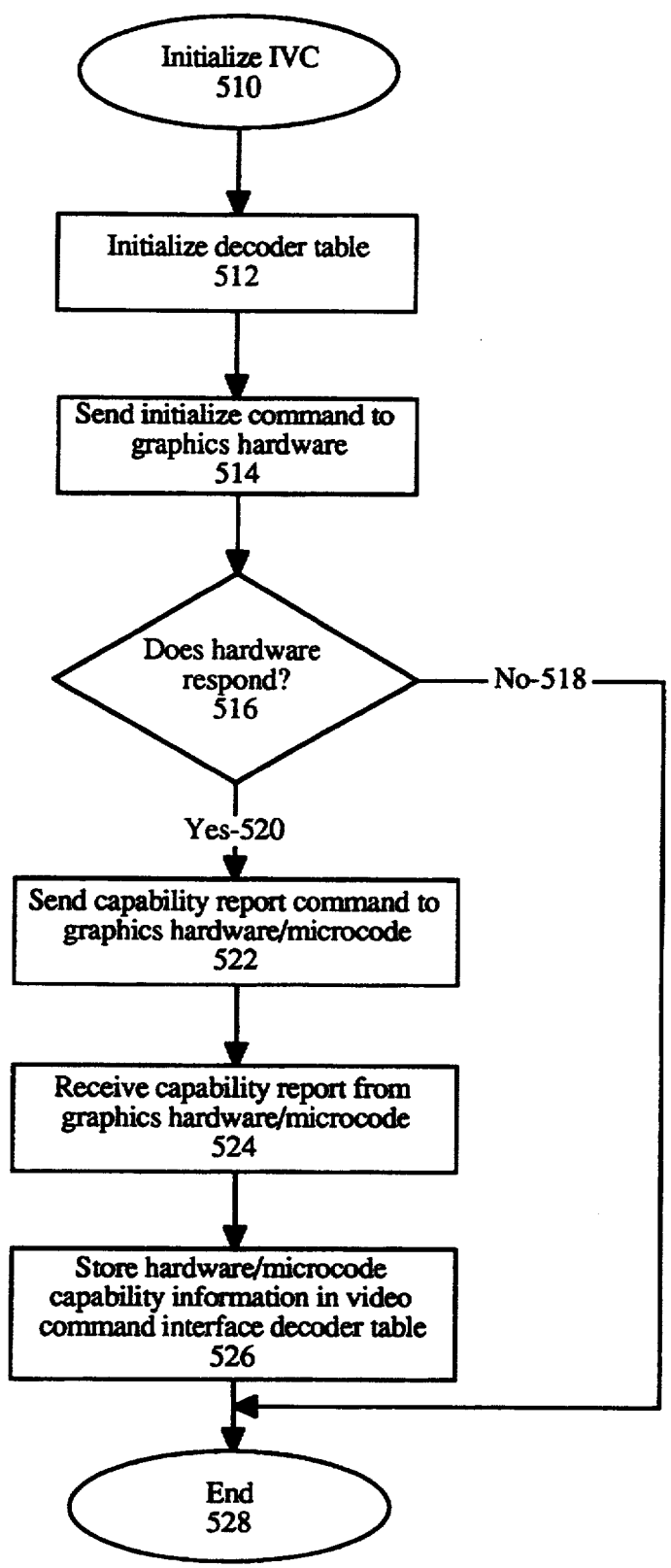

Referring now to FIG. 5, the processing logic for the initialize IVC operation is illustrated. At bootstrap initialization or reset of the computer system used in the present invention, an initialize command may be sent to video command interface 412 via video API 314. Upon receipt of an initialization request, the processing logic starting at the bubble 510 illustrated in FIG. 5 is executed. The first operation performed by the initialization logic is the initialization of the decoder table resident within video command interface 412 (processing block 512). This decoder table is illustrated in FIG. 6 and described above. This decoder table is initialized by setting each of the entries within the table to a null or empty value. Next, an initialization command is sent to video controller interface 440 which attempts to establish communications with a graphics controller 116 (processing block 514). If the graphics hardware responds (processing path 520), a command is sent to the graphics hardware to respond with a capability report which comprises capability information related to graphics hardware/microcode resident video decoders provided by the hardware. This capability information includes a decoder identification code and capability code equivalent to the fields by the same name in the decoder table as illustrated in FIG. 6. The address and length fields of the hardware resident decoders may not be applicable; however, the address field for hardware resident decoders may be used to define a particular decoder as hardware resident. This information is sent by the graphics hardware to video command interface 412 and stored in the decoder table in processing block 526. Processing for the initialize IVC operation then terminates at bubble 528 as illustrated in FIG. 5.

Figure 8:

After completion of the initialize IVC operation, an application program may then initiate the loading of software resident decoders using the load decoder operation described below in connection with FIG. 9. As an alternative embodiment of the initialize IVC operation, however, the application program may be instructed to load particular video decoders as determined using a minimum capability table as illustrated in FIG. 8. Referring now to FIG. 8, the minimum capability table is illustrated. The minimum capability table defines a minimum video decoder configuration for supporting a particular application. The minimum capability table defines a plurality of video blenders necessary for supporting an application in a minimum configuration. This minimum capability is specified by entries in the minimum capability table corresponding to each of the required video decoders. For each required decoder, an identification code and a minimum capability code is stored in the minimum capability table. The format of the identification code field in the minimum capability table is equivalent to the identification code field in the decoder table illustrated in FIG. 6. Similarly, the format of the minimum capability field of the minimum capability table is equivalent to the capability code field of the decoder table illustrated in FIG. 6.

Figure 7:
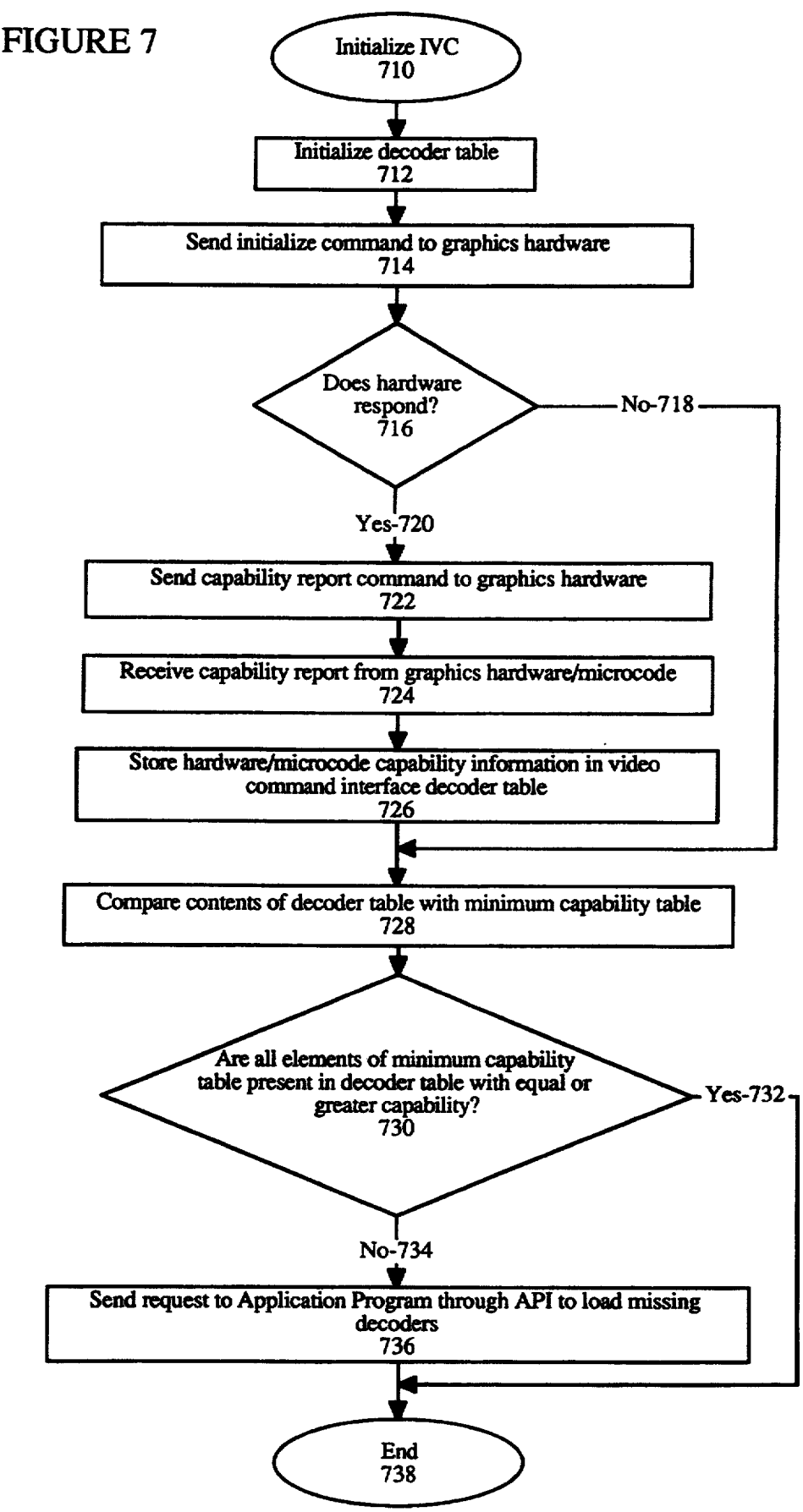

Referring now to FIG. 7, an alternative embodiment of the initialize IVC operation using the minimum capability table is illustrated. In a manner similar to the operation performed for the initialize IVC operation illustrated in FIG. 5, the alternative embodiment of the initialize IVC operation illustrated in FIG. 7 first initializes the decoder table (processing block 712) and sends an initialize command to the graphics hardware (processing block 714). If the graphics hardware responds, the capability report from the graphics hardware is requested and stored in the video command interface decode table in processing block 726. Similarly, if the graphics hardware does not respond (processing path 718), the hardware resident video decoder information is not stored in the decoder table. Next, the alternative embodiment of the initialize IVC operation compares the contents of the newly loaded decoder table with the contents of the minimum capability table (processing block 728). If each of the required decoders present in the minimum capability table are found in the decoder table with an equal or greater capability code, processing path 732 is taken and processing for the alternative initialize IVC operation terminates at bubble 738. Processing path 732 is taken when the graphics controller hardware has reported the presence of hardware/microcode resident video decoders with a capability equal or greater to that of the specified minimum configuration. If, however, the minimum configuration is not achieved by the hardware/microcode resident decoders, processing path 734 is taken to processing block 736. At processing block 736, a request is sent to the application program via video API 314 specifying the missing video decoders that are required to establish the minimum configuration specified by the minimum capability table. In a subsequent operation, the application program may initiate a load decoder operation to load software based video decoders in order to establish at least the minimum configuration. Thus, two alternative embodiments of the initialize IVC operation are described.

Figure 9:
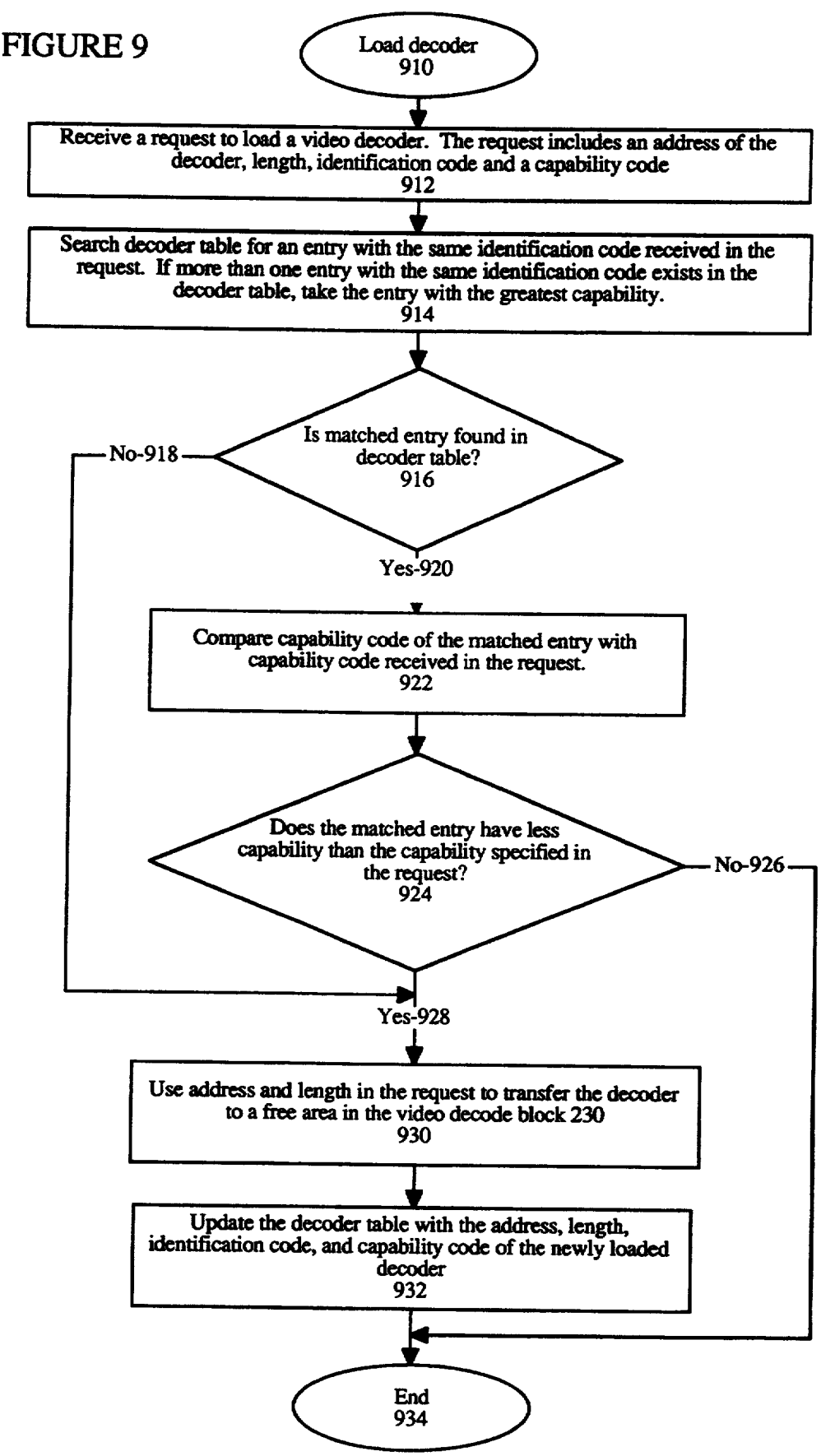

Referring now to FIG. 9, the processing logic for the load decoder operation is illustrated. The load decoder operation is initiated by an application program through video API 314. The video command interface 412 performs the load decoder operation upon request by an application program. The processing logic for the load decoder operation starts upon initiation at the bubble labeled load decoder 910 illustrated in FIG. 9. As part of a load decoder request, an application program provides an address of the video decoder to be loaded, a length value that specifies the memory storage requirements necessary to retain the decoder processing logic, a decoder identification (ID) code that specifies the type of video data that may be processed by the decoder, and a capability code that specifies the level of functionality, quality, and speed provided by the video decoder being loaded. Upon receipt of a load decoder request (processing block 912) the decoder table resident in video command interface 412 is searched for an entry with the same identification code as the identification code received in the load decoder request. If more than one entry in the decoder table exists with the same identification code, the entry with the greatest capability code is retrieved. The purpose of this search of the decoder table is to determine if a software or hardware microcode resident video decoder capable of decoding a similar type of video data is already loaded or made available by the hardware. If an entry in the decoder table is found, processing path 920 is taken to processing block 922 where the capability code of the matched entry is compared with the capability code of the decoder for which a load request has been received. If the capability of the video decoder already resident in the decoder table is greater than or equal to the capability provided by the decoder for which loading has been requested, processing path 926 is taken to bubble 934 where processing for the load decoder operation terminates. In this case, the decoder to be loaded provides decoding of the same type of data with less capability than a decoder already provided by either software resident or hardware/microcode resident decoder. If, however, the decoder to be loaded can decode a different type of video data or provides decoding with a greater capability than present in the decoder table, processing path 928 is taken to processing block 930 where the decoder is loaded into a free area in the video decode block 230. The address and length provided with the loading request are used to obtain a large enough memory block within video decode block 230 for storage of the processing logic and data associated with the newly loaded decoder. After the decoder is loaded (processing block 930), a new entry in the decoder table is created for the newly loaded decoder. The information stored in the new entry in the decoder table comprises the address, length, identification code, and capability code of the newly loaded decoder (processing block 932). Processing for the load decoder operation then terminates at bubble 934 as illustrated in FIG. 9.

Figure 10:
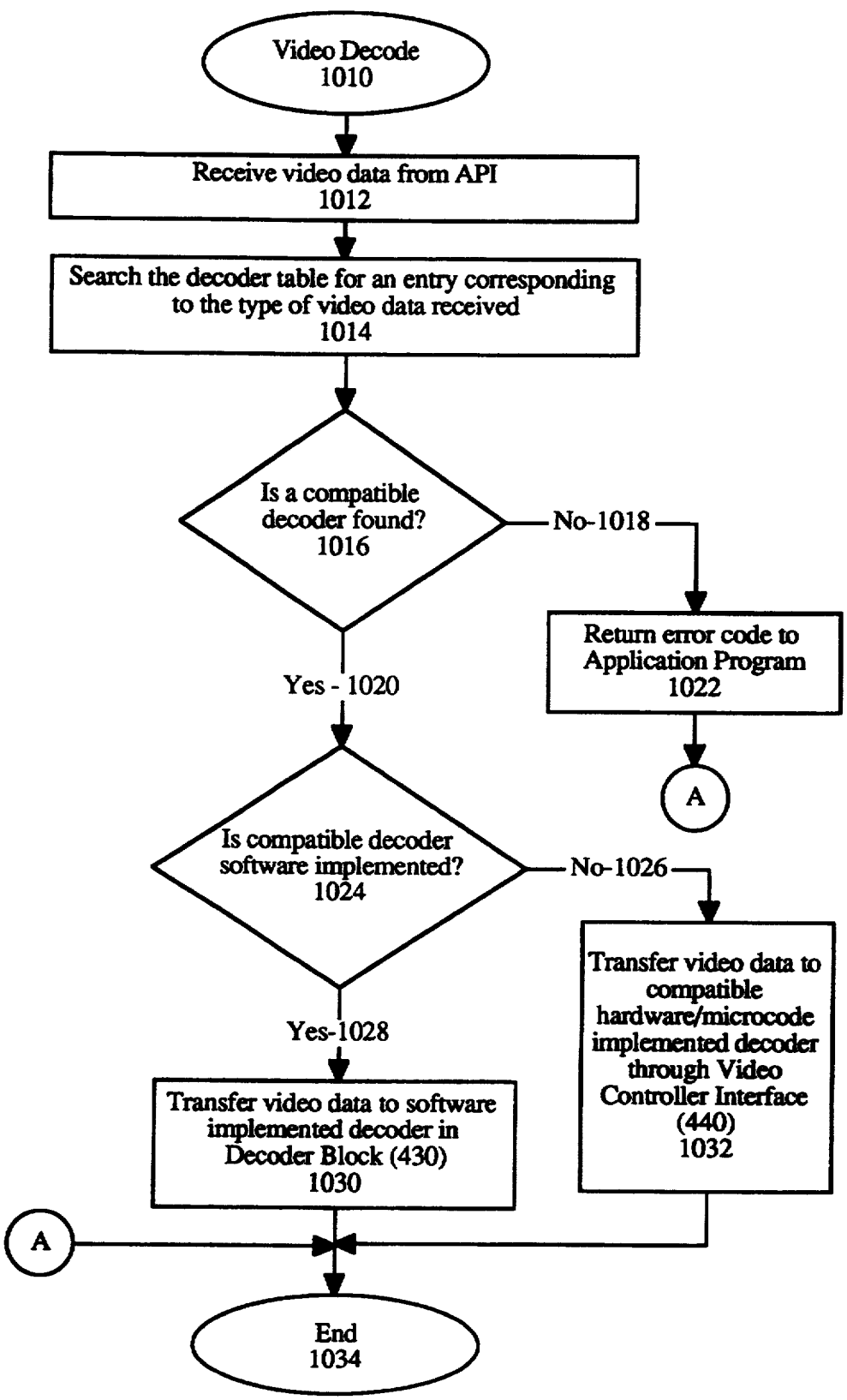

Referring now to FIG. 10, the processing logic performed during a video decode operation is illustrated. Following the initialize IVC and load decoder operations described above, the IVC 320 is ready for the processing of video data through video API 314. Using a prior art interface of video API 31.4, video data may be transferred from an application program to IVC 320. This video data comprises a stream of video frames represented in a specified video format. This stream of video data is received by video command interface 412 in processing block 1012. On receipt of this video data, the decoder table is searched for an entry corresponding to the type of video data received (processing block 1014). The type of video data specified for a particular video data stream corresponds to the identification code field of the video decoders resident in the decoder table. By comparing the identification code of video decoders resident in the decoder table, it can be determined if a decoder compatible with the incoming video stream data type is resident. If this is not the case, processing path 1018 is taken to processing block 1022 where an error code is returned to the application program through video API 314. Processing then terminates at the bubble labeled 1034 as illustrated in FIG. 10.

If a video decoder compatible with the incoming video stream is located in the decoder table, processing path 1020 is taken to decision block 1024. As described earlier, data within the decoder table for each resident decoder specifies whether the decoder is software or hardware/microcode resident. If the compatible decoder is software implemented (processing path 1028), the incoming video stream is transferred to the compatible software implemented decoder in decoder block 430 (processing block 1030). If, however, the compatible decoder corresponding to the incoming video stream is hardware/microcode resident, the incoming video stream is transferred to the compatible hardware/microcode implemented decoder through video controller interface 440 (processing block 1032). Processing then terminates for the video decode operation at bubble 1034 illustrated in FIG. 10. Thus, for a particular video decoding operation, the application program may provide a stream of video data without being aware whether that video data is processed using software resident or hardware resident video decoders.

Figure 11:
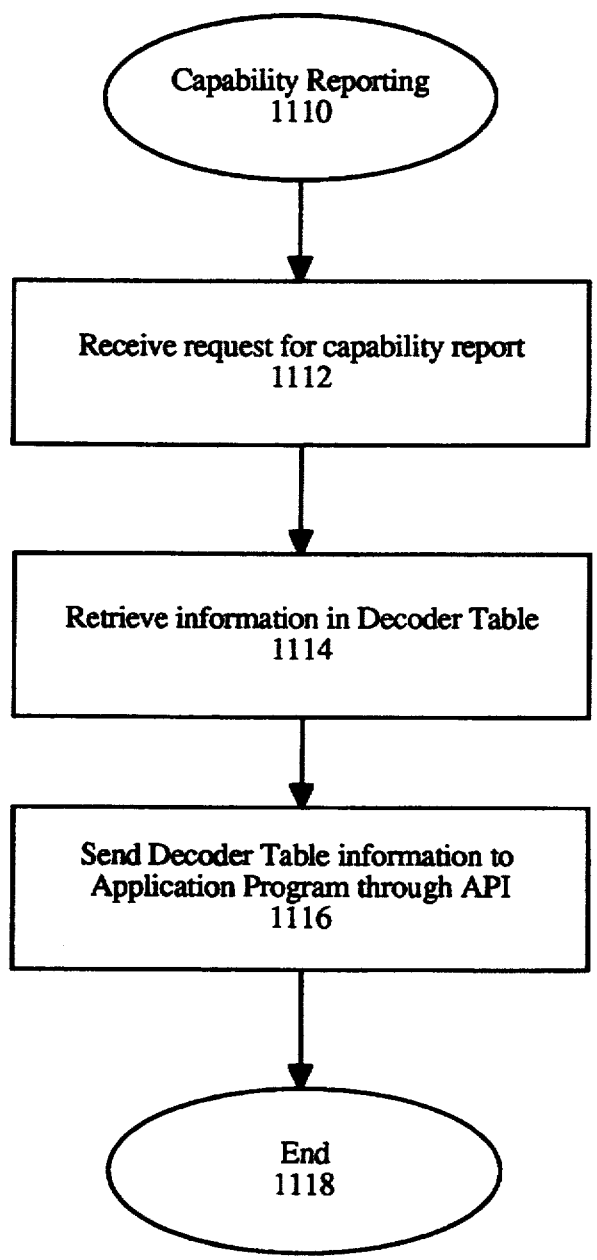

5Referring now to FIG. 11, the processing logic for the capability reporting operation is illustrated. Using the capability reporting operation, an application program may query the capability provided by an IVC 320. In this manner, an application program may determine if a sufficient level of video decoding support is provided by the integrated graphics/video controller. Using this information, the application program may choose to load an additional software based video decoder or limit the functionality of the application program in a manner consistent with the capability provided by the IVC 320. The application program issues a capability reporting request through video API 314. Video command interface 412 receives the capability reporting request at processing block 1112. Video command interface 412, in response to the capability reporting request, retrieves the information contained within the decoder table resident within video command interface 412 (processing block 1114). The information contained within the decoder table is illustrated in FIG. 6 and described above. This information is sent to the application program through video API 314 (processing block 1116). Processing for the capability reporting operation then terminates at bubble 1 118 as illustrated in FIG. 11.

Referring again to FIG. 4, mask driver 414 is a software module interposed between graphics command interface 410 and display driver 416. Mask driver 414 includes processing logical for generating a mask bitmap and clipping information used by blender 418 for combining graphics information with video information. This processing logic is described below in connection with FIGS. 12-14.

Figure 12:
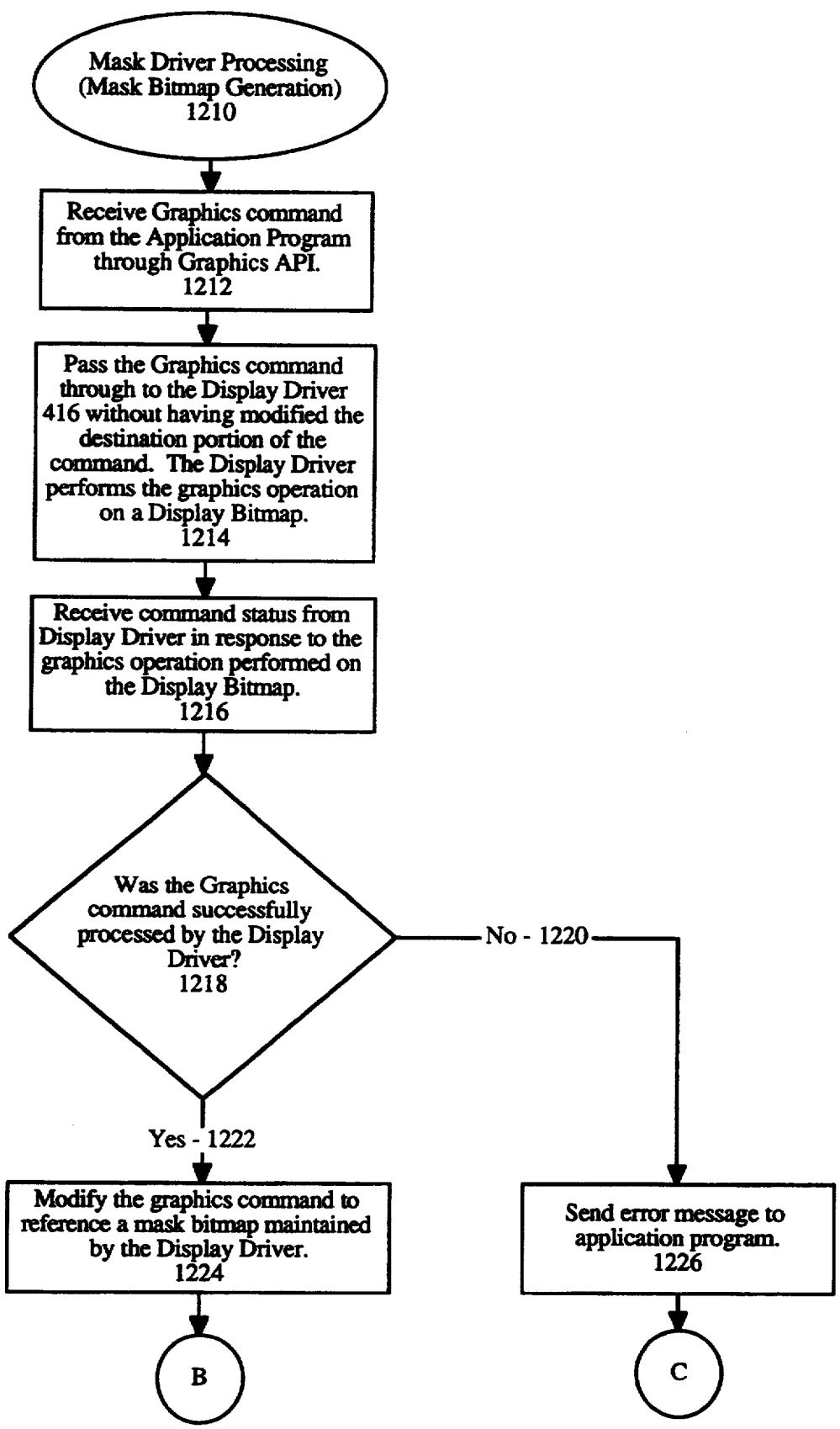
FIGS. 12-14 are flowcharts illustrating the processing logic of the mask driver.

Referring now to FIG. 12, the processing logic performed by mask driver 414 for generating a mask bit map is illustrated. Mask driver 1414 receives a graphics command stream from an application program through graphics API 312 and graphics command interface 410 and creates a mask bit map from these graphics commands. Mask driver 414 creates a mask bit map that corresponds to a normally displayed bit map generated by the graphics command stream. The mask bit map created by mask driver 414 is used by blender 414. In order to combine graphics and video data, blender 418 must know where the graphics information is located to prevent video data from overwriting the graphics pixels when video information is updated at the video frame rate. Because blender 418 must know where the graphics pixels are located, the mask bit map created by mask driver 414 is used for this purpose. It should be noted that the operation of mask driver 414 is usable with existing graphical device drivers. Further, the operation of mask driver 4 14 does not interfere with behavior of the graphics command stream between the graphics API 312 and display driver 416. Mask driver 414 produces the exact same mask bit map (pixel for pixel) as would appear on the display screen. There is no different between what appears on the display screen and the information maintained in the mask bit map. Further, the mask driver 414 allows display driver 416 to perform all interpretation of the commands in the graphics command stream. Thus, graphics command stream interpretation logic is not duplicated in mask driver 414. The user of mask driver 414 enables software emulation of a dual frame buffer system (chromakey) operation on a single frame buffer platform. The user of mask driver 414 allows the blending of graphics and video data without the direct involvement of an application program.

The mask driver is interposed between the Graphics API 312 and the display driver 416 during the initialization of the system. An initialization process modifies the system configuration file (i.e. the SYS.INI file in the preferred embodiment) to replace the name of the mask driver 414 for the name of the display driver 416. In this manner, the system activates the mask driver as if it was activating the display driver 416.

It should also be noted that the mask created by the mask driver can be more than one pixel in depth. Thus, a mask can be used to blend pixels in a gradual blended process instead of simply allowing or disallowing the display of particular pixels.

The processing logic of mask driver 414 from producing a mask bit map is initiated upon receipt of a graphics command stream from graphics command interface 410. Upon receipt of a graphics command, processing begins and processing block 1212 illustrated in FIG. 12. Each graphics command f the graphics command stream received by mask driver 414 comprises a command portion and destination portion. The destination portion of the graphics command identifies a display bit map upon which the graphics operation identified by the graphics command is to be performed. Upon receipt of the graphics command, mask driver 414 saves a copy of the graphics command and passes the graphics command unmodified through to display driver 416. The display driver thereafter using conventional techniques performs the graphics operation on the display bit map identified by the destination portion of the graphics command (processing block 1214). Upon completion of the graphics operation performed by display driver 416, display driver 416 sends commands status back to mask driver 414. The command status identifies the success of failure of the graphics operation performed on the display bit map. It will be apparent to those skilled in the art that this status information may includes other command operation status information. As indicated by the command status, if the graphics command was successfully processed by the display driver, processing path 1222 is taken to processing block 1224. If, however, an error occurred or the graphics command could not be successfully processed by the display driver processing path 1220 is taken to processing block 1226. At processing block 1226, an error message is sent back through graphics command interface 410 and graphics API 312 to the application program initiating the graphics command stream. Processing for this air condition then terminates through the bubble labeled C as illustrated in-FIG. 13.

For successful processing of the graphics command as performed on the display bit map, processing block 1224 is executed. As processing block 1224, the graphics command in modified by mask driver 414 to reference a mask bit amp maintained by display driver 416. The command portion of the graphics command i snot modified. Only the destination portion of the graphics command is modified to now reference a mask bit map instead of the display bit map previously referenced processing continues at the bubbles labeled B as illustrated in FIG. 13.

Figure 13:
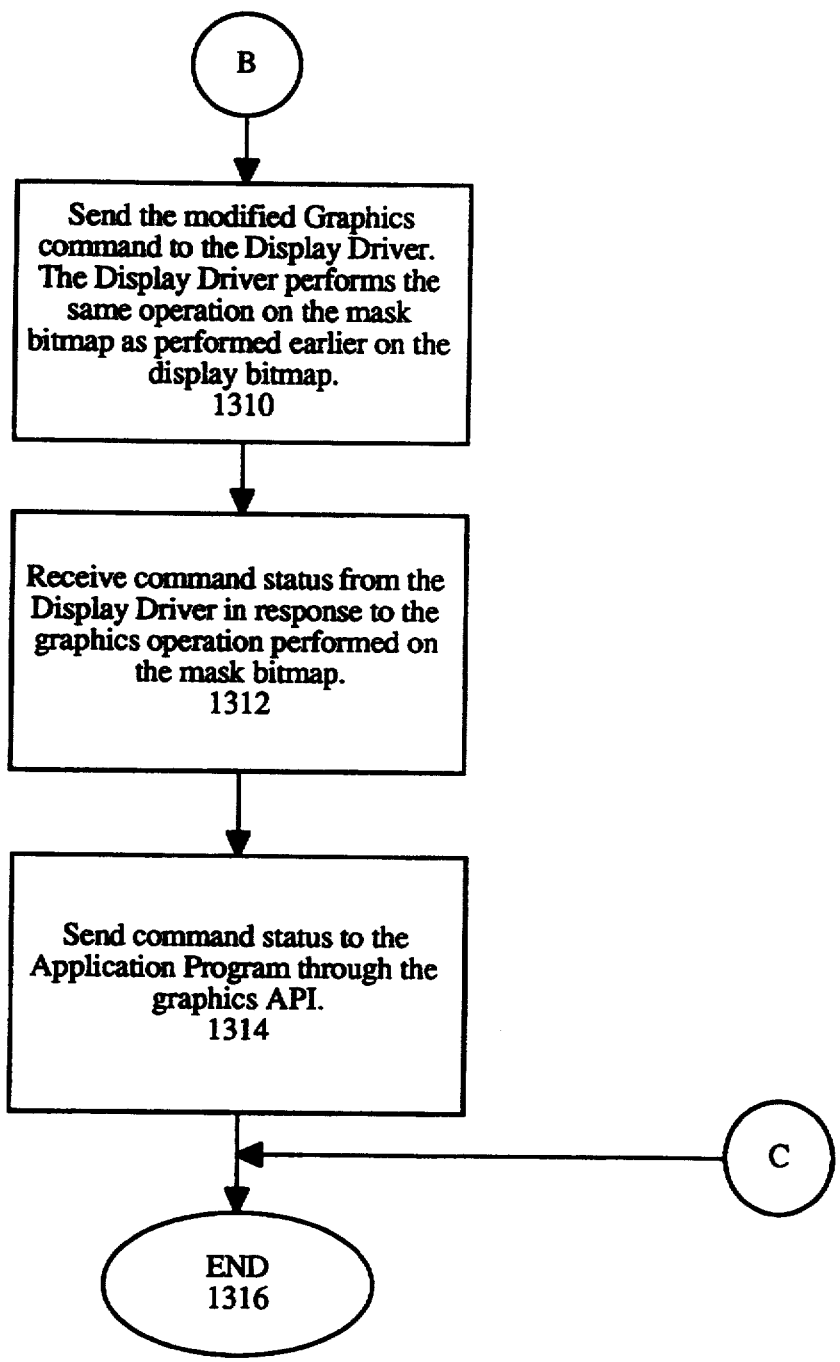

Referring now to FIG. 13, processing for the mask driver 415 continues a processing block 1410. The modified graphics command is set to display driver 416. The display driver 416 performs the same operation on the mask bit amp as was performed earlier on the display bit ma. In this manner, the mask bit map contents correlate exactly to the contents of the display bit map. Once the graphics operation performed on the mask bit map has been completed by display driver 416, the command status associated with the operation is returned to mask driver 414 in processing block 1412. This command status is then sent through mask driver 414, graphics command interface 410, and graphics API 312 to the application program in processing block 1314. The mask generation process performed by mask driver 414 then terminates at the bubble 1316 as illustrated in FIG. 13. Masks generated by mask driver 414 are stored in area 420 as illustrates in FIG. 4. These masks are used by blender 418 during the process of blending graphics information with video information.

In a alternative embodiment, the process performed by the mask driver 414 may be modified so that the modified graphics command is sent first to the display driver followed later by the unmodified graphics command if the modified command is process successfully.

Figure 14:
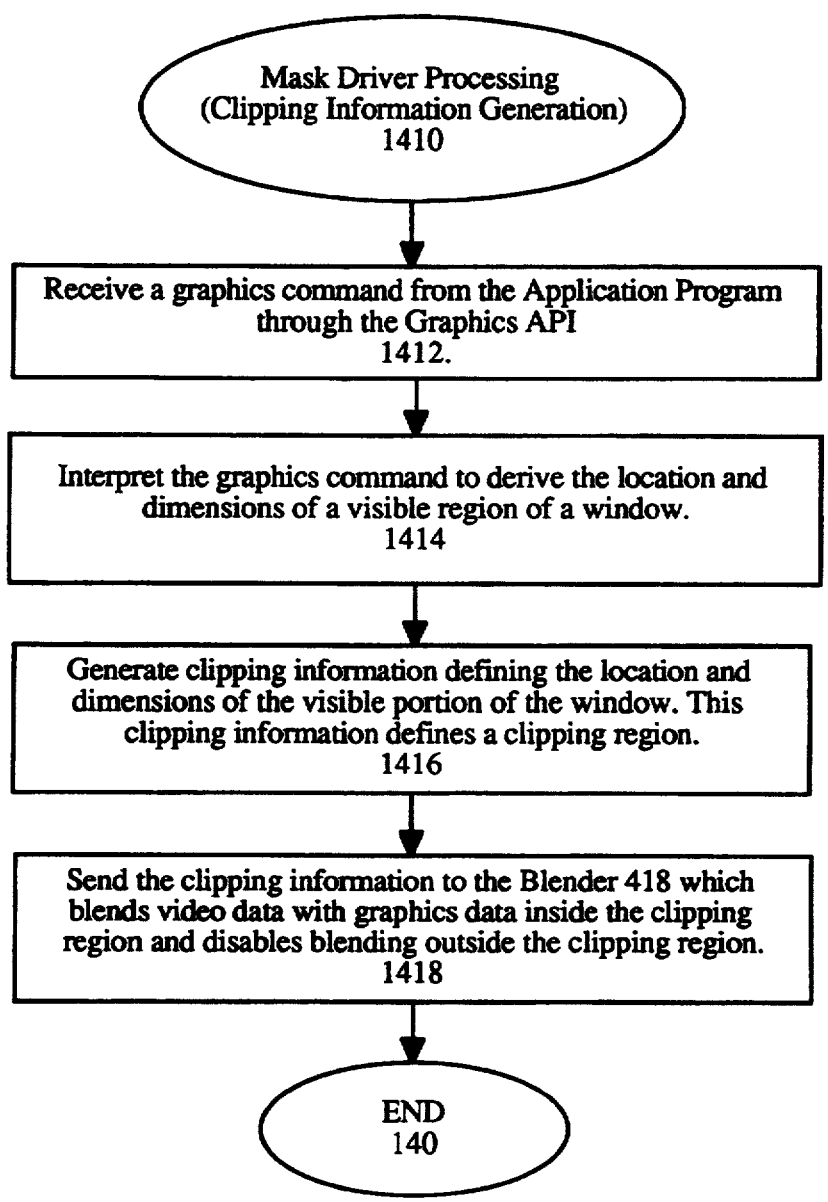

Mask driver 414 also performs an operation of generating clipping information also user by blender 418. The processing logic for generating this clipping information is illustrated in FIG. 14. In conventional systems, to display an image on a windowed display screen, a graphics coprocessor first creates a bit map in memory corresponding to the windowed area. This windowed area is created using graphics commands passed through graphics API 312. In a second operation, other graphics commands are used through graphics API 312 for creating an image displayed in the windowed region. This two pass operation through graphics API 312 may be an expensive operation. The generation of clipping information by mask driver 414 allows a properly windowed image to be created in frame buffer 322. This configuration increases the performance in the display of images by a graphics coprocessor. Further, the display of graphics images may be accelerated using a graphics coprocessor that is independent of the main processor (CPU).

Referring now to FIG. 14, the clipping information generation performed by mask driver 414 is illustrated starting at bubble 1410. First, mask driver 414 receives a graphics command from an application program through graphics API 312 and graphics command interface 410. The received command is interpreted by mask driver 414 to derive the location and dimensions of a visible window region (processing block 1414). Based on the location and dimensions of this visible window region, clipping information is generated that defines this window region (processing block 1416). This clipping information generated by mask driver 414 defines a clipping region. This clipping information s sent by mask driver 414 to blender 418 fro storage in area 424. During the process of combining or blending graphics information with video information, blender 418 uses clipping information 424 to blend graphics with video. Blender 418 blends video data with graphics data for the area defined within or inside the clipping region defined by clipping information 424. For the area outside of the clipping region, blender 418 disables the blending of video with graphics information (processing 1418). Thus, mask driver 1414 cooperates with blender 418 to provide a means for using graphics commands to define widowed regions on a display screen that are used to enable of disable the display of video information.

Thus, an integrated graphics and video display system for manipulating and viewing both graphical and video data in a single integrated system is described. These specific arrangement and methods herein are merely illustrative of the principles of this invention. Numerous modifications in form and detail may be made by those skilled in the art without departing from the spirit and scope of the present invention. Although this invention has been shown in relation to a particular embodiment, it should not be considered so limited. Rather, it is limited only by the appended claims.

We claim:

1. In a computer display system that can display graphics information and video information simultaneously, a process for generating a graphics mask, said graphics mask being used to blend graphics information with video information for display by said computer display system, said process comprising the steps of:
   receiving a graphics command from an application program, said graphics command referencing a graphics image stored in a display bitmap;
   sending said graphics command in an unmodified form to a display driver for command interpretation and processing by said display driver;
   receiving command status from said display driver, said command status indicating whether said display driver completed interpretation and processing of said unmodified graphics command;
   modifying said graphics command to reference a graphics mask stored in a mask bitmap;
   sending said graphics command in modified form to said display driver for command interpretation and processing by said display driver, said display driver processing said graphics mask in a manner equivalent to processing of said unmodified graphics command.

2. The process as claimed in claim 1 wherein said command status indicates successful or unsuccessful processing of said unmodified graphics command by said display driver, said steps of modifying said graphics command and sending said graphics command in modified form to said display driver not being performed if said command status indicates unsuccessful processing of said unmodified graphics command.

3. The process as claimed in claim 3 further including the step of:
   sending said command status to said application program, said command status indicating unsuccessful processing of said unmodified graphics command by said display driver or successful processing of said modified graphics command by said display driver.

4. The process as claimed in claim 1 further including the step of:
   sending said command status to said application program.

5. The process as claimed in claim 1 wherein all interpretation of said unmodified graphics command and said modified graphics command is performed by said display driver.

6. In a computer display system, a system for generating a graphics mask, said system comprising:
   means for receiving a graphics command from an application program, said graphics command referencing a graphics image stored in a display bitmap;
   means for sending said graphics command in an unmodified form to a display driver for command interpretation and processing by said display driver;
   means for receiving command status from said display driver, said command status indicating whether said display driver completed interpretation and processing of said unmodified graphics command;
   means for modifying said graphics command to reference a graphics mask stored in a mask bitmap;
   means for sending said graphics command in modified form to said display driver for command interpretation and processing by said display driver, said display driver processing said graphics mask in a manner equivalent to processing of said graphics image.

7. The system as claimed in claim 6 wherein said command status indicates successful or unsuccessful processing of said unmodified graphics command by said display driver, said means for modifying said graphics command and means for sending said graphics command in modified form to said display driver not being activated if said command status indicates unsuccessful processing of said unmodified graphics command.

8. The system as claimed in claim 7 further including:
   means for sending said command status to said application program, said command status indicating unsuccessful processing of said unmodified graphics command by said display driver or successful processing of said modified graphics command by said display driver.

9. The system as claimed in claim 6 further including:
   means for sending said command status to said application program.

10. The system as claimed in claim 6 wherein all interpretation of said unmodified graphics command and said modified graphics command is performed by said display driver.

11. In a computer display system having a display, a process for integrating the processing of graphics and video information, the process comprising the steps of:
   receiving a graphics command from an application program, said graphics command referencing a graphics image stored in a display bitmap;
   generating clipping information using said graphics command, said clipping information specifying a clipping region within a visible window of said display;
   generating a graphics mask, said graphics mask specifying whether video information may overwrite graphics information within said clipping region;
   receiving graphics information from said application program;
   receiving compressed video information from said application program;
   decoding said compressed video information to produce decoded video information; and
   blending said decoded video information and said graphics information within said clipping region using said graphics mask to produce composite image data, wherein blending is enabled within said clipping region and disabled outside of said clipping region.

12. The process of claim 11, wherein the process further comprises the step of writing said blended data to a frame buffer for display.

13. The process of claim 11, wherein the step of generating a graphics mask comprises the steps of:
   sending said graphics command to a display driver for command interpretation and processing by said display driver; and
   receiving a command status from said display driver, said command status indicating whether said display driver completed interpretation and processing of said unmodified graphics command;
   modifying said graphics command to reference said graphics mask; and
   sending said graphics command as modified to said display driver for command interpretation and processing by said display driver, said display driver processing said graphics mask as modified in a manner equivalent to processing of said graphics command when said graphics command referenced said display bitmap.

14. The process of claim 13, wherein said command status indicates successful or unsuccessful processing of said graphics command by said display driver.

15. The process of claim 11, wherein the step of generating clipping information comprises the step of interpreting said graphics command to determine a location and dimensions of a visible window region of said display, said location and dimensions of said visible window region specifying said clipping region.

16. The process of claim 11, wherein said compressed video information may be in one of a plurality of compression formats, the process further comprising the step of reporting whether said computer display system can provide a compatible decoding of said compressed video information.

17. The process of claim 16, wherein the step of reporting comprises the steps of:
   receiving a request for capability information from said application program;
   sending capability information to said application program, wherein said capability information includes a list of all installed video data decoders, each video data decoder being identified by a capability code.

18. The process of claim 11, wherein the step of decoding said decompressed video information comprises the steps of:
   providing a plurality of independently installed video data decoders for decoding said compressed video information, said video data decoders being either software implemented video decoders or hardware implemented video decoders;
   selecting one video data decoder of said plurality of video data decoders, said selected video data decoder for providing a compatible decoding of said compressed video information; and
   decoding said compressed said video information using said selected video data decoder to produce decoded video information.

19. In a computer display system having a display, a system for integrating the processing of graphics and video information, the system comprising:

means for receiving a graphics command from an application program, said graphics command referencing a graphics image stored in a display bitmap;

means for generating clipping information using said graphics command, said clipping information specifying a clipping region within a visible window of said display;

means for generating a graphics mask, said graphics mask specifying whether video information may overwrite graphics information within said clipping region;

means for receiving graphics information from said application program;

means for receiving compressed video information from said application program;

means for decoding said compressed video information to produce decoded video information; and means for blending said decoded video information and said graphics information within said clipping region using said graphics mask to produce composite image data, wherein blending is enabled within said clipping region and disabled outside of said dipping region.

20. The system of claim 19, wherein the system further comprises:

means for writing said blended data to a frame buffer for display.

21. The process of claim 19, wherein said means for generating a graphics mask comprises:

means for sending said graphics command to a display driver for command interpretation and processing by said display driver; and means for receiving a command status from said display driver, said command status indicating whether said display driver completed interpretation and processing of said unmodified graphics command;

means for modifying said graphics command to reference said graphics mask; and means for sending said graphics command as modified to said display driver for command interpretation and processing by said display driver, said display driver processing said graphics mask as modified in a manner equivalent to processing of said graphics command when said graphics command referenced said display bitmap.

22. The system of claim 21, wherein said command status indicates successful or unsuccessful processing of said graphics command by said display driver.

23. The system of claim 19, wherein said means for generating clipping information comprises means for interpreting said graphics command to determine a location and dimensions of a visible window region of said display, said location and dimensions of said visible window region specifying said clipping region.

24. The system of claim 19, wherein said compressed video information may be in one of a plurality of compression formats, the system further comprising means for reporting whether said computer display system can provide a compatible decoding of said compressed video information.

25. The system of claim 24, wherein said means for reporting comprises:

means for receiving a request for capability information from said application program;

means for sending capability information to said application program, wherein said capability information includes a list of all installed video data decoders, each video data decoder being identified by a capability code.

26. The process of claim 25, wherein said means for decoding said decompressed video information comprises:

means for providing a plurality of independently installed video data decoders for decoding said compressed video information, said video data decoders being either software implemented video decoders or hardware implemented video decoders;

means for selecting one video data decoder of said plurality of video data decoders, said selected video data decoder for providing a compatible decoding of said compressed video information; and means for decoding said compressed said video information using said selected video data decoder to produce decoded video information.

* * * * *

UNITED STATES PATENT AND TRADEMARK OFFICE
CERTIFICATE OF CORRECTION

PATENT NO. : 5,432,900
DATED : July 11, 1995
INVENTOR(S) : Rhodes et al.

It is certified that error appears in the above-identified patent and that said Letters Patent is hereby corrected as shown below:

In column 2 at line 6 delete "tom" and insert --torn--

In column 7 at line 18 delete "20" and insert --320--

In column 8 at line 23 delete "flames" and insert --frames--

In column 18 at line 55 delete "3" and insert --2--

In column 21 at line 23 delete "dipping" and insert --clipping--

Signed and Sealed this

Twelfth Day of August, 1997

*Attest:*

BRUCE LEHMAN

*Attesting Officer*          *Commissioner of Patents and Trademarks*